United States Patent
Huang

(10) Patent No.: US 9,323,349 B2
(45) Date of Patent: Apr. 26, 2016

(54) HAND-WRITING PEN AND MOBILE TERMINAL

(75) Inventor: Lianfang Huang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 99 days.

(21) Appl. No.: 13/985,973

(22) PCT Filed: Jun. 9, 2011

(86) PCT No.: PCT/CN2011/075546
§ 371 (c)(1),
(2), (4) Date: Aug. 16, 2013

(87) PCT Pub. No.: WO2012/109832
PCT Pub. Date: Aug. 23, 2012

(65) Prior Publication Data
US 2013/0321360 A1 Dec. 5, 2013

(30) Foreign Application Priority Data
Feb. 16, 2011 (CN) .................. 2011 2 0040071 U

(51) Int. Cl.
| | |
|---|---|
| *G06F 3/033* | (2013.01) |
| *G01B 3/06* | (2006.01) |
| *G01B 3/56* | (2006.01) |
| *B43K 29/00* | (2006.01) |
| *B43K 29/08* | (2006.01) |
| *B43K 5/00* | (2006.01) |
| *G06F 3/0354* | (2013.01) |

(52) U.S. Cl.
CPC ................ *G06F 3/033* (2013.01); *B43K 5/005* (2013.01); *B43K 29/00* (2013.01); *B43K 29/004* (2013.01); *B43K 29/08* (2013.01); *G01B 3/06* (2013.01); *G01B 3/56* (2013.01); *G06F 3/03545* (2013.01)

(58) Field of Classification Search
USPC .................................. 345/179, 163, 156, 184
See application file for complete search history.

(56) References Cited

U.S. PATENT DOCUMENTS

| | | | | |
|---|---|---|---|---|
| 8,657,397 | B2* | 2/2014 | Aubouy et al. .................... 347/9 |
| 2005/0073508 | A1* | 4/2005 | Pittel ...................... G06F 1/3203 345/175 |
| 2006/0176288 | A1* | 8/2006 | Pittel ...................... G06F 1/3203 345/179 |
| 2007/0030258 | A1* | 2/2007 | Pittel ...................... G06F 1/3203 345/179 |
| 2008/0001078 | A1* | 1/2008 | Pittel ...................... G06F 1/3203 250/252.1 |
| 2010/0302213 | A1* | 12/2010 | Yeh ............................... 345/179 |
| 2012/0229427 | A1* | 9/2012 | Li .................................. 345/179 |

FOREIGN PATENT DOCUMENTS

| | | |
|---|---|---|
| CN | 101206538 A | 6/2008 |
| CN | 101901063 A | 12/2010 |

* cited by examiner

*Primary Examiner* — Thuy Pardo
(74) *Attorney, Agent, or Firm* — Ladas & Parry LLP

(57) ABSTRACT

A hand-writing pen and a mobile terminal are provided by the disclosure, wherein the hand-writing pen includes a penholder, the penholder includes a first rod and a second rod, the first rod and the second rod are connected by a rotation structure, an angle sensor module is set in the rotation structure, the angle sensor module is configured to obtain an angle signal of rotation of the first rod or the second rod and transmit the angle signal of the rotation to the mobile terminal used in coordination with the hand-writing pen. Calibration marks are also set on the penholder. By using the hand-writing pen and the mobile terminal, the mobile terminal carrying with the hand-writing pen can provide a measurement function, which greatly improves user experience.

17 Claims, 3 Drawing Sheets

Hand-writing pen 50

Wireless communication apparatus 52

Processing apparatus 54

Display apparatus 56

Fig. 6

HAND-WRITING PEN AND MOBILE TERMINAL

RELATED APPLICATION INFORMATION

This application is a 371 of International Application PCT/CN2011/075546 filed 9 Jun. 2011 entitled "Hand-Writing Pen and Mobile Terminal", which was published on 23 Aug. 2012, with International Publication Number WO 2012/109832 A1, and which claims priority from CN Application No.: 201120040071.6 filed 16 Feb. 2011, the contents of which are incorporated herein by reference.

TECHNICAL FIELD

The disclosure relates to the field of electronic communications, and in particular, to a hand-writing pen and a mobile terminal.

BACKGROUND

Hand-writing pen is an important information inputting device. With the continuous popularization of various mobile terminals, such as cell phones, having a touch screen function, the hand-writing pen also becomes more and more popular.

At the same time, when taking angle or length measurements, people need an additional measurement tool to take measurements. However, modern social people usually do not carry any measurement tool with themselves except some specialists.

In the related art, the measurement of length and angle is realized by way of adding calibrations or a dial on the shell of a mobile terminal, which will affect the appearance of the mobile terminal and make it inconvenient to measure the angle of graphics on a page. Regarding the problems in the related art, no effective solution has been presented currently.

SUMMARY

Regarding the problems in the related art that the measurement of length or angle is realized by way of adding calibrations or a dial on the shell of a mobile terminal and it thus affects the appearance of the mobile terminal and makes it inconvenient to measure the angle of graphics on a page, the disclosure provides a hand-writing pen and a mobile terminal, so as to solve at least one of the above-mentioned problems.

According to one aspect of the disclosure, a hand-writing pen is provided, including: a first rod and a second rod, wherein the first rod and the second rod are connected by a rotation structure; an angle sensor module is set in the rotation structure, and the angle sensor module is configured to acquire an angle signal of rotation of the first rod or the second rod and transmit the angle signal to a mobile terminal used in coordination with the hand-writing pen.

A wireless communication module is set on the penholder, wherein the wireless communication module is connected to the angle sensor module and is configured to transmit the angle signal acquired by the angle sensor to the mobile terminal in a wireless communication manner.

The wireless communication module includes at least one of the following: a Bluetooth communication module, an infrared communication module, a Radio Frequency (RF) communication module and a Wireless Fidelity (WIFI) communication module. Calibration marks are set on the penholder.

The hand-writing pen further includes: a power supply module which is configured to provide working power supply for the hand-writing pen.

The power supply module is a rechargeable battery; and a charging structure for charging the rechargeable battery is set on the penholder.

The charging structure includes: one or more metal clip terminals; and when the hand-writing pen is inserted into a pen insertion slot of the mobile terminal, the one or more metal clip terminals are electrically connected to metal shrapnel inside the pen insertion slot, and the metal shrapnel is electrically connected to a battery of the mobile terminal.

The angle sensor module includes: an angle displacement sensor.

According to another aspect of the disclosure, a mobile terminal is provided, including: the above-mentioned hand-writing pen; and a wireless communication apparatus which is coupled with the hand-writing pen and is configured to receive the angle signal acquired by the angle sensor module of the hand-writing pen.

The mobile terminal further includes: a processing apparatus which is connected to the wireless communication apparatus and is configured to process the angle signal received by the wireless communication apparatus to obtain an angle value; and a display apparatus which is connected to the processing apparatus and is configured to display the angle value. In the disclosure, length measurement is realized by way of setting calibrations on the hand-writing pen; angle measurement is realized by setting an angle sensor module in a rotation structure of the hand-writing pen, thus achieving the effect of enabling a mobile terminal with a hand-writing pen to have a measurement function while not affecting the appearance of the mobile terminal and making it convenient for measuring the angle of graphics on a page, thereby improving the user experience.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein:

FIG. 6 is a structural block diagram of a mobile terminal according to a preferred embodiment of the disclosure.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
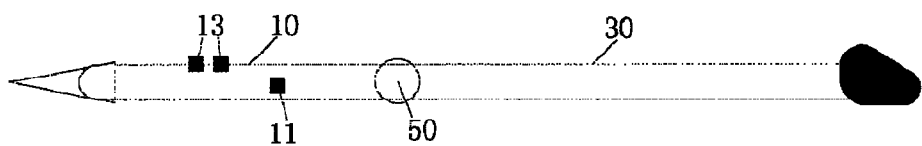
FIG. 1 is a structural schematic diagram of a hand-writing pen according to an embodiment of the disclosure.

FIG. 1 is a structural schematic diagram of a hand-writing pen according to an embodiment of the disclosure. As shown in FIG. 1, the hand-writing pen includes: a penholder, wherein the penholder includes: a first rod 10 and a second rod 30;

the first rod 10 and the second rod 30 are connected by a rotation structure 50, an angle sensor module is set in the rotation structure 50, and the angle sensor module is configured to obtain an angle signal of rotation of the first rod or the second rod and transmit the angle signal to a mobile terminal used in coordination with the hand-writing pen.

In the above-mentioned embodiment, angle measurement is realized by setting an angle sensor module in a rotation structure of the hand-writing pen, thus achieving the effect of enabling a mobile terminal with a hand-writing pen to have a measurement function while not affecting the appearance of the mobile terminal and making it convenient for measuring the angle of graphics on a page, thereby improving the user experience.

During specific application, a wireless communication module 11 is set on the penholder, wherein the wireless communication module 11 is connected to the angle sensor module and is configured to transmit the angle signal acquired by the angle sensor module to the mobile terminal in a wireless communication manner. During specific application, the wireless communication module 11 may be set on the first rod 10 or the second rod 30.

During implementation, the wireless communication module may include at least one of the following: a Bluetooth communication module, an infrared communication module, an RF communication module and a WIFI communication module. During practical application, the wireless communication module can be set flexibly according to economic costs or communication quality and so on.

Figure 2:
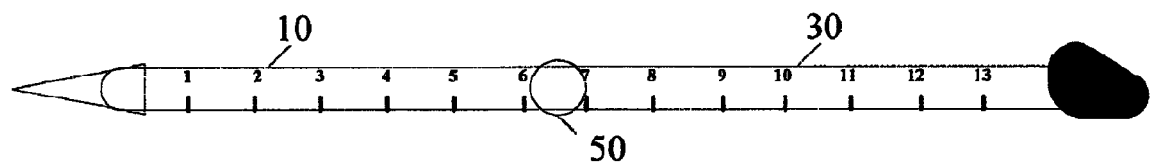
FIG. 2 is a schematic diagram of a hand-writing pen having calibrations according to a preferred embodiment of the disclosure.

Preferably, as shown in FIG. 2, the penholder is also set thereon with calibration marks. The penholder has calibrations which can be used to measure the length of an object. For a stretchable hand-writing pen, calibration marks can be made on the penholder before expanded, and calibration marks can also be made on the penholder after expanded completely. During specific application, independent calibration marks can be set respectively on the first rod 10 or the second rod 30, or continuous calibration marks can be set on the first rod 10 and the second rod 30.

When the angle sensor module or the wireless communication module on the hand-writing pen needs power supply from the outside, the hand-writing pen may also include: a power supply module which is configured to provide working power supply to the hand-writing pen. During implementation, the power supply module may be set on the penholder (on the first rod 10 or the second rod 30).

During preferred implementation, the power supply module may be a rechargeable battery; and the penholder may also be set thereon with a charging structure 13 which is configured to charge the rechargeable battery.

Preferably, the charging structure 13 may include one or more metal clip terminals; when the hand-writing pen is inserted into a pen insertion slot of the mobile terminal, the one or more metal clip terminals are electrically connected to metal shrapnel inside the pen insertion slot, and the metal shrapnel is electrically connected to a battery of the mobile terminal. As such, the power supply module (rechargeable battery) of the hand-writing pen can be charged using the battery in the mobile terminal. During specific application, the charging structure 13 may also employ other structures, such as a metal ring structure fixedly suited on the outer surface of the penholder and so on.

During preferred implementation, the angle sensor module may include: an angle displacement sensor. As such, when the first rod 10 or the second rod 30 rotates, a displacement signal acquired by the angle displacement sensor can be transmitted to the mobile terminal via the wireless communication module, so that the mobile terminal can perform calculation processing to obtain a corresponding angle value and display the angle value.

For better understanding the above-mentioned embodiment, description will be given in conjunction with specific examples and relevant figures hereinafter.

In this example, the penholder of the hand-writing pen has calibrations and corresponding numerical values, wherein the minimum calibration is millimeter or centimeter and so on, and specific reference can be made to FIG. 2. The calibration marking manner on the hand-writing pen can ensure that the calibrations can be used normally when the hand-writing pen is in the original state and the completely expanded state.

Figure 3:
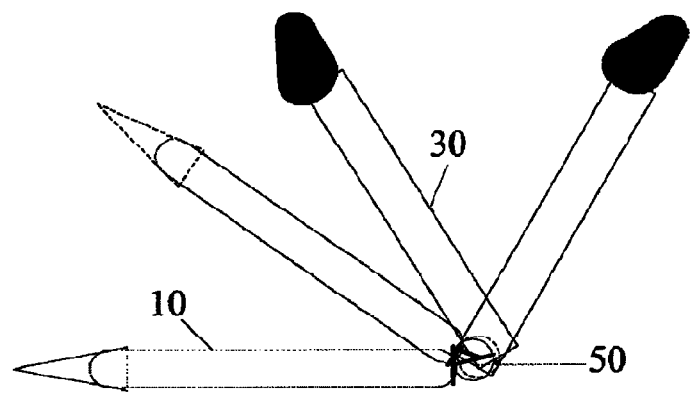
FIG. 3 is a schematic diagram of a rotation state of a hand-writing pen according to an example of the disclosure.

As shown in FIG. 3, the penholder of the hand-writing pen contains a rotation structure 50. The rotation structure 50 is a rotation shaft, and the first rod 10 or the second rod 30 of the hand-writing pen can rotate about the rotation shaft freely. An angle displacement sensor is contained on the rotation shaft and is configured to measure the displacement of upper and lower parts, i.e. the second rod 30 and the first rod 10, relative to the initial position. During angle measurement, clockwise/anticlockwise is defined as the positive direction; when the lower part, i.e. the first rod 10, keeps stationary, the upper part, i.e. the second rod 30, moves toward the positive direction, the included angle is "180 degrees+displacement angle"; and when the upper part keeps stationary and the lower part moves toward the positive direction, the included angle is "180 degrees−displacement angle". The measured angle is the included angle between the upper part and the lower part of the penholder. The angle displacement sensor takes the position where the penholder does not make any deformation or rotation as the initial position, and the initial angle is 180 degrees. Of course, during specific application, it can also be defined that when the upper part, i.e. the second rod 30, moves toward the positive direction, the included angle is "180 degrees−displacement angle"; and when the upper part keeps stationary and the lower part moves toward the positive direction, the included angle is "180 degrees+displacement angle".

In this example, the above-mentioned charging structure 13 includes two metal contacts for charging the rechargeable battery in the hand-writing pen. When the hand-writing pen is inserted into the pen slot of a cell phone, the rechargeable battery in the hand-writing pen is charged by the battery of the cell phone; and when the hand-writing pen is taken out from the pen slot, the battery in the hand-writing pen supplies power to the angle displacement sensor. It needs to be noted that here the angle displacement sensor needs to be powered from the outside, and when the angle displacement sensor does not need to be powered from the outside, the power supply module, i.e. rechargeable battery, here can merely supply power to the wireless communication module.

In this example, a Bluetooth chip is embedded inside the hand-writing pen, and the angle signal (displacement information) is transferred between the hand-writing pen and the cell phone in a Bluetooth manner. The processor of the cell phone processes and displays the received angle signal.

It needs to be noted that this example is not limited to transferring the angle signal by applying Bluetooth, instead, other wireless communication manners can also be employed, for example, Radio Frequency Identification (RFID), WIFI, infrared and so on.

It needs to be noted that this example is not limited to transferring the angle signal in a wireless manner, instead, a hardware connection manner, i.e. a wired connection form, can also be employed to transfer the angle signal.

Figure 4:
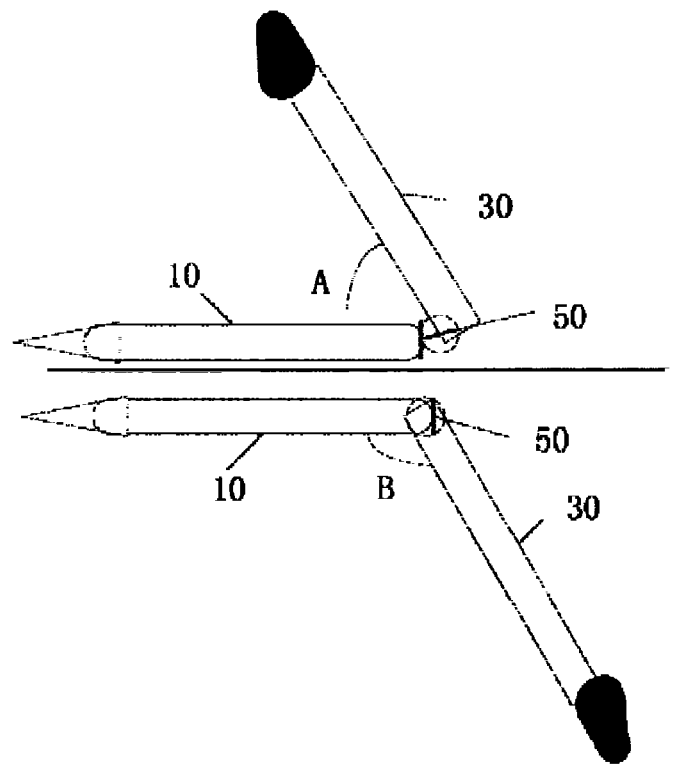
FIG. 4 is a schematic diagram of the angle measurement state of a hand-writing pen according to an example of the disclosure.

FIG. 4 is a schematic diagram of the angle measurement state of a hand-writing pen according to an example of the disclosure. As shown in FIG. 4, the upper and lower parts of the hand-writing pen, i.e. the second rod 30 and the first rod 10, both can rotate about the rotation shaft, i.e. the rotation structure 50, freely, (approximately within a range of 360 degrees); and the initial angles between the upper and lower parts are 180 degrees.

When the penholder of the hand-writing pen rotates, the angle displacement sensor generates a displacement signal and transfers the displacement signal to the processor module of the cell phone through Bluetooth; the processor module of the cell phone processes the displacement signal and displays the result on the cell phone screen. In FIG. 4, angle A is 60 degrees, and angle B is 240 degrees. In this example, angles A and B can be displayed on the display screen of the mobile terminal.

Figure 5:
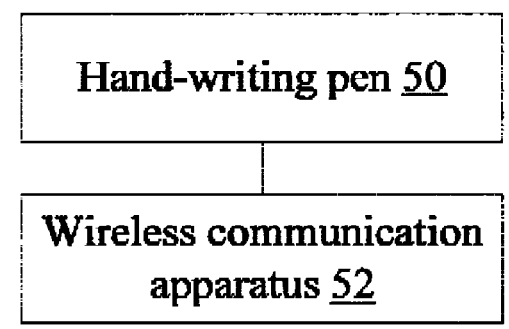
FIG. 5 is a structural block diagram of a mobile terminal according to an example of the disclosure.

FIG. 5 is a structural block diagram of a mobile terminal according to an example of the disclosure. As shown in FIG. 5, the mobile terminal includes:

a hand-writing pen 50 mentioned above, a wireless communication apparatus 52 which is coupled with the hand-writing pen 50 and is configured to receive the angle signal acquired by the angle sensor module of the hand-writing pen 50.

Preferably, as shown in FIG. 6, the above-mentioned mobile terminal may further include: a processing apparatus 54 which is connected to the wireless communication apparatus 52 and is configured to process the angle signal received by the wireless communication apparatus 52 to obtain an angle value, and the processing here can be calculation and so on; and a display apparatus 56 which is connected to the processing apparatus 54 and is configured to display the angle value.

During specific application, the mobile terminal in the above-mentioned embodiment may further include a power supply management module which is configured to provide working power supply to the hand-writing pen, or when the power supply module inside the hand-writing pen is a rechargeable battery, charge the battery.

In summary, in the above-mentioned embodiments, length measurement is realized by the calibrations on the hand-writing pen; and angle measurement is realized by virtue of the feature that the hand-writing pen can rotate freely in a manner of adding an angle displacement sensor on the rotation shaft. The above manner enables a terminal having a hand-writing pen to have a measurement function by way of processing the hand-writing pen, which greatly facilitates the use by the user. In addition, the disclosure can reach the intended effects by merely making slight modifications to the hand-writing pen without making large-scale software and hardware variations, which can greatly save the costs.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A hand-writing pen, comprising a penholder, wherein the penholder comprises a first rod and a second rod;
   the first rod and the second rod are connected by a rotation structure; and
   an angle sensor module is set in the rotation structure, and the angle sensor module is configured to acquire an angle signal of rotation of the first rod or the second rod and transmit the angle signal to a mobile terminal which is used in coordination with the hand-writing pen; wherein,
   the angle sensor module comprises: an angle displacement sensor;
   a wireless communication module is set on the penholder, wherein the wireless communication module is connected to the angle sensor module and is configured to transmit the angle signal acquired by the angle sensor module to the mobile terminal in a wireless communication manner;
   when the first rod or the second rod rotates, a displacement signal acquired by the angle displacement sensor is transmitted to the mobile terminal via the wireless communication module;
   the mobile terminal performs calculation processing to obtain a corresponding angle value and display the angle value.

2. The hand-writing pen according to claim 1, wherein the wireless communication module comprises at least one of the following:
   a Bluetooth communication module, an infrared communication module, a Radio Frequency (RF) communication module and a Wireless Fidelity (WIFI) communication module.

3. The mobile terminal, comprising:
   the hand-writing pen as claimed in claim 2; and
   a wireless communication apparatus which is coupled with the hand-writing pen and is configured to receive the angle signal acquired by the angle sensor module of the hand-writing pen.

4. The hand-writing pen according to claim 1, wherein calibration marks are set on the penholder.

5. The hand-writing pen according to claim 4, further comprising: a power supply module which is configured to provide working power supply for the hand-writing pen.

6. The hand-writing pen according to claim 5, wherein the power supply module is a rechargeable battery; and
   a charging structure for charging the rechargeable battery is set on the penholder.

7. The hand-writing pen according to claim 6, wherein the charging structure comprises: one or more metal clip terminals; and
   when the hand-writing pen is inserted into a pen insertion slot of the mobile terminal, the one or more metal clip terminals are electrically connected to metal shrapnel inside the pen insertion slot, and the metal shrapnel is electrically connected to a battery of the mobile terminal.

8. The mobile terminal, comprising:
the hand-writing pen as claimed in claim 4; and
a wireless communication apparatus which is coupled with the hand-writing pen and is configured to receive the angle signal acquired by the angle sensor module of the hand-writing pen.

9. The hand-writing pen according to claim 1, further comprising: a power supply module which is configured to provide working power supply for the hand-writing pen.

10. The hand-writing pen according to claim 9, wherein the power supply module is a rechargeable battery; and
a charging structure for charging the rechargeable battery is set on the penholder.

11. The hand-writing pen according to claim 10, wherein the charging structure comprises: one or more metal clip terminals; and
when the hand-writing pen is inserted into a pen insertion slot of the mobile terminal, the one or more metal clip terminals are electrically connected to metal shrapnel inside the pen insertion slot, and the metal shrapnel is electrically connected to a battery of the mobile terminal.

12. The hand-writing pen according to claim 1, further comprising: a power supply module which is configured to provide working power supply for the hand-writing pen.

13. The hand-writing pen according to claim 12, wherein the power supply module is a rechargeable battery; and
a charging structure for charging the rechargeable battery is set on the penholder.

14. The hand-writing pen according to claim 13, wherein the charging structure comprises: one or more metal clip terminals; and
when the hand-writing pen is inserted into a pen insertion slot of the mobile terminal, the one or more metal clip terminals are electrically connected to metal shrapnel inside the pen insertion slot, and the metal shrapnel is electrically connected to a battery of the mobile terminal.

15. The hand-writing pen according to claim 1, wherein the angle sensor module comprises: an angle displacement sensor.

16. The mobile terminal, comprising:
the hand-writing pen as claimed in claim 1; and
a wireless communication apparatus which is coupled with the hand-writing pen and is configured to receive the angle signal acquired by the angle sensor module of the hand-writing pen.

17. A mobile terminal, comprising:
the hand-writing pen as claimed in claim 1; and
a wireless communication apparatus which is coupled with the hand-writing pen and is configured to receive the angle signal acquired by the angle sensor module of the hand-writing pen; wherein,
the angle sensor module comprises: an angle displacement sensor;
a processing apparatus which is connected to the wireless communication apparatus and is configured to process the angle signal received by the wireless communication apparatus to obtain an angle value; and
a display apparatus which is connected to the processing apparatus and is configured to display the angle value;
when the first rod or the second rod rotates, a displacement signal acquired by the angle displacement sensor is transmitted to the mobile terminal via the wireless communication module; the mobile terminal performs calculation processing to obtain a corresponding angle value and display the angle value.

* * * * *